Dec. 29, 1964      A. W. BLANSHINE      3,163,334
STOCK FEEDER
Filed Sept. 17, 1962
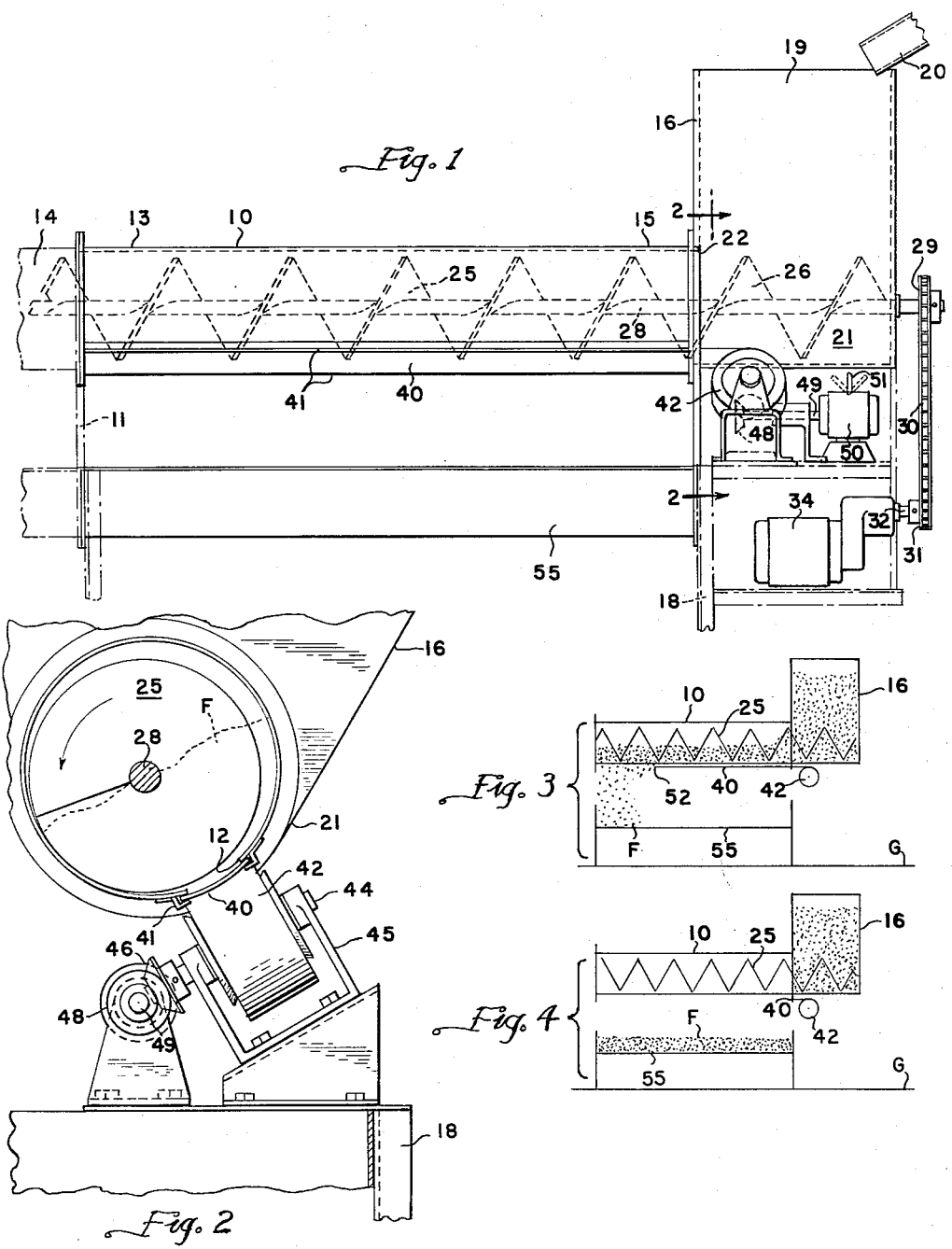
INVENTOR.
ALLISON W. BLANSHINE
BY
*Joseph A. Brown*
ATTORNEY

United States Patent Office 3,163,334
Patented Dec. 29, 1964

3,163,334
STOCK FEEDER
Allison W. Blanshine, Lititz, Pa., assignor to Sperry Rand Corporation, New Holland, Pa., a corporation of Delaware
Filed Sept. 17, 1962, Ser. No. 223,999
5 Claims. (Cl. 222—412)

This invention relates generally to conveying apparatus and more particularly to a device for delivering feed to stock animals.

Heretofore, stock feeders have been provided which operate to mechanically convey and distribute feed. Usually, an elongated horizontally extending feed trough is provided and mounted above the trough is conveying apparatus, commonly an auger. The auger operates to withdraw feed from a supply hopper and progressively fill the trough beginning at the hopper end thereof.

The gradual and progressive feeding of a feed trough causes some problems with the stock animals. Boss animals tend to crowd around the portion of the trough which receives the feed first and prevent weaker animals from access to such area. Further, when the stronger animals consume the portion of the feed deposited in front of them, they will move to other sections of the trough to get additional feed. This disrupts peaceful feeding of the animals and the excitement reduces weight gain. Moreover, some animals receive too much feed and others too little. It is recognized as being highly desirable to have all portions of the feed trough receive feed at substantially the same time so that all animals will have equal opportunity to feed.

One object of this invention is to provide a stock feeder which operates to deposit feed substantially simultaneously along all portions of a feed trough.

Another object of this invention is to provide a feeder of the character described which is of simpler construction than similar feeders of prior design.

A further object of this invention is to provide a stock feeder which can be utilized and properly run by an inexperienced operator and nevertheless achieve a substantially uniform depositing of feed along all portions of a feed trough.

A further object of this invention is to provide a feeder structure which is relatively simple both to manufacture, assemble and repair thereby making a feeder a highly desirable item for farm use.

Other objects of this invention will be apparent hereinafter from the specification and from the recital in the appended claims.

In the drawing:

FIG. 1 is a fragmentary side elevation of a stock feeder constructed according to this invention;

FIG. 2 is an enlarged transverse vertical section taken generally on the line 2—2 of FIG. 1 looking in the direction of the arrows;

FIG. 3 is a diagrammatic view showing the beginning of a discharge operation of the feeder; and FIG. 4 is a similar diagrammatic view showing a feed discharge operation completed.

Referring now to the drawings by numerals of reference, and particularly to FIGS. 1 and 2, 10 denotes a container which is tubular in form and extends generally horizontally. Container 10 is supported at spaced intervals by support members 11. The container has a discharge opening 12 in the form of a longitudinally extending, elongated, continuous slot which extends for the major portion of the length of the container. As shown in FIG. 2, opening 12, while located in a bottom portion of the container 10, is offset somewhat toward one side of the container. The container may be of any desired length, such as seventy feet long and be made up plural, interconnected sections each of a given length such as ten feet long. In FIG. 1, one full container section is shown at 13 and part of a second section is shown at 14.

At one open end 15 of the container 10, the structure is connected to a feed hopper 16 supported on a frame structure 18. Hopper 16 is open at its top 19 to receive feed from a supply pipe 20. Feed deposited in hopper 16 drops to a lower portion 21 thereof which has a side discharge opening at 22 communicating with the end 15 of container 10.

An auger 25 is provided which extends throughout the length of the container 10 and having a portion 26 which extends into the bottom 21 of hopper 16. Auger 25 includes a shaft 28 which projects outwardly of the hopper 16 and has affixed thereto a drive sprocket 29. Sprocket 29 is connected by an endless chain 30 to a drive sprocket 31 connected to the output shaft 32 of a motor 34. When motor 34 is operated, auger 25 is rotated and material is withdrawn from the bottom 21 of hopper 16 and conveyed and distributed along the length of the container 10 and its opening 12.

For controlling the discharge of material from container 10, a flexible band 40 is provided which when in normal position closes opening 12 throughout the length of the container. Band 40 is supported by L-shaped brackets 41 affixed to container 10 and extending longitudinally on opposite sides of opening 12. The end of band 40 adjacent hopper 16 is connected to a reel 42 having an axial shaft 44 supported on bracket means 45. Reel 42 is mounted with its axis at an angle relative to the horizontal and perpendicular to band 40. At one end, shaft 44 carries a bevel gear 46 which meshes with another bevel gear 48 connected by a shaft 49 to a reversible electric motor 50. Motor 50 has a conventional switch 51 which when in a neutral position is shut-off. If the switch 51 is pivoted in one direction it causes the motor to operate in one direction and if the switch is flipped in the opposite direction, it causes the motor to drive in reverse.

To operate the feeder, motor 34 is started to drive auger 25. The auger withdraws material from the hopper 16 and simultaneously conveys and distributes the feed along the length of the container 10. The feed F becomes banked at an incline along one side of the container 10 as indicated in FIG. 2, such side being that portion which has the opening 12. When the feed reaches the end of the container remote from the hopper 16, the operator starts motor 50 to drive reel 42 in such direction that flexible band 40 is retracted and wound on the reel. Motor 50 operates at high speed and the band is rapidly retracted. As the band is wound up, the terminal end thereof indicated at 52 in FIG. 3, moves toward the hopper 16. As it moves towards the hopper, the feed in container 10 is free to drop through opening 12 and be deposited beneath the container. Commonly, a trough 55 is provided from which animals standing side by side may feed, although any receiving structure may be employed. The withdrawal of band causes the feed to be deposited in the trough 55 at a point remote from the hopper 16 and progressively toward the hopper. However, the speed of retraction is such that all portions of the hopper receive feed at substantially the same time. In FIG. 4, the band is shown fully retracted and the feed uniformally distributed throughout feed trough 55.

When the band 40 is being retracted, the auger 25 may be allowed to operate to assist in agitating the feed and assisting the flow thereof through the opening 12. This will produce a slightly increase amount of feed at the end of the trough close to the hopper 16. However, the retraction of band 40 is such that the increase in feed in such area is minimal. Also, the amount of such additional discharge will vary according to the type of feed being handled. It will be apparent further that, if desired, the motor 34 can be shut-off during a discharge operation.

After the feed which has been conveyed and distributed throughout the length of container 10 has been discharged therefrom, the motor 50 is operated in reverse to power move the band 40 back to its original position closing the opening 12. Once the band is fully reeled out to an extended position, the container is ready to be again filled with a supply of feed for trough 55. When refilled, the operation is the same as previously described.

For any given feeding operation, the container 10 may be filled and dumped any desired number of times. For example, it might be found necessary to fill-and-dump container 10 three or four times to secure the desired amount of feed in the trough 55.

The structure described, lends itself to complete automation, if desired. For example, auger 25 can be operated for a given timed interval and then the motor 50 operated in one direction to withdraw band 40 and secure the discharge of feed. On reaching a fully retracted position, suitable means can be provided to reverse the motor 50 and cause the band to be extended back to its original position. Any desired number of cycle operations can be incorporated to produce a desired deposit of feed in the trough 55.

While this invention has been described in connection with a particular embodiment thereof, it will be understood that it is capable of modification, and this application is intended to cover any variations, uses or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A feeder for stock animals comprising an elongated generally horizontally extending container having a longitudinal discharge opening in a bottom portion thereof, said container extending a substantial distance along the ground whereby a plurality of stock animals may stand side by side at the container, said opening being substantially continuous and extending along a major portion of the length of said container, a hopper communicating with said container to supply feed thereto, feed conveying means within said container operative to distribute supplied feed along said opening and in a substantially continuous stream, a flexible continuous band extending substantially the length of the container and normally closing said opening, means mounting said band for longitudinal movement relative to said container, a rotatable reel at one end of said opening and around which one end of said band is wound, said reel when rotated in one direction winding said band upon the reel and retracting it from said opening whereupon feed may be discharged from said container through said opening, and power means operating said reel.

2. A feeder for stock animals as recited in claim 1 wherein said conveying means comprises an auger which, when it conveys feed, banks the feed against one side of the container, said opening being located along said one side.

3. A feeder for stock animals as recited in claim 1 wherein said power means is reversible, being operable in one direction to retract and wind up said band on said reel and in an opposite direction to extend the band to said opening closing position.

4. A feeder for stock animals as recited in claim 1 wherein said power means operates at relatively high speed whereby the discharge of feed through said opening is substantially simultaneous along all portions of the opening.

5. A feeder for stock animals comprising a supply hopper, an elongated container communicating with said hopper and extending generally horizontally therefrom for a substantial distance along the ground so that a plurality of stock animals may stand side by side at the container, said container having a substantially continuous longitudinal opening in a bottom portion thereof, which opening extends substantially the full length of the container, feed conveying means within said container and operative to receive material from said hopper and distribute it in a substantially continuous stream along said opening, a flexible band extendable to close said opening and being retractable axially relative to the container to open the opening, a wind-up reel to retract said band and on which the band is wound, and means for operating said reel.

References Cited by the Examiner
UNITED STATES PATENTS

| 2,907,500 | 10/59 | Kerkvliet | 222—412 X |
| 2,940,639 | 6/60 | Winter | 222—412 X |
| 3,051,294 | 8/62 | Reed | 119—56 X |

FOREIGN PATENTS

| 492,539 | 5/53 | Canada. |

RAPHAEL M. LUPO, *Primary Examiner.*

LAVERNE D. GIEGER, LOUIS J. DEMBO, *Examiners.*